June 13, 1939. H. E. ANDERSON 2,162,342
BOLSTER SPRING
Filed Nov. 4, 1938 2 Sheets-Sheet 2
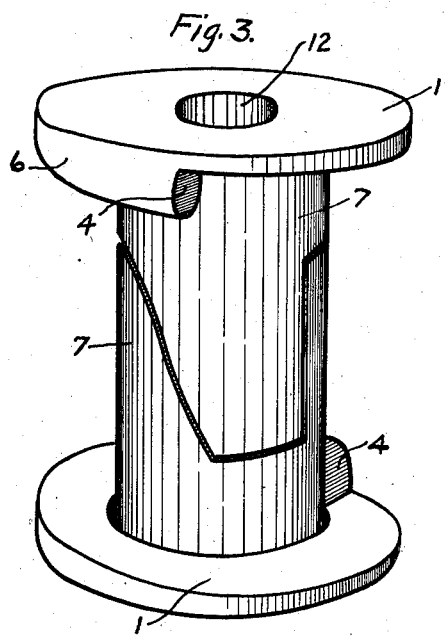
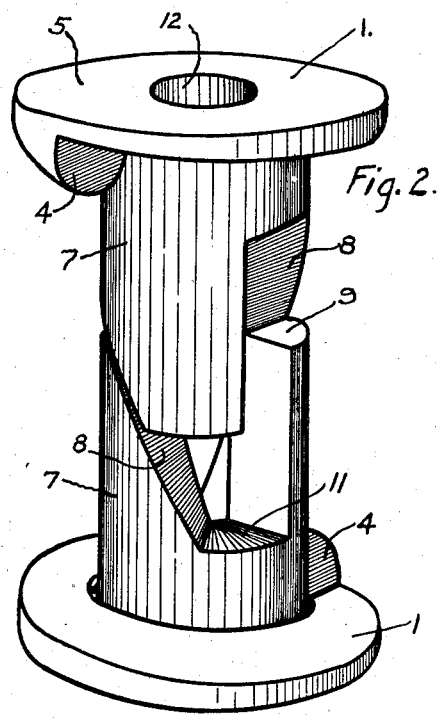
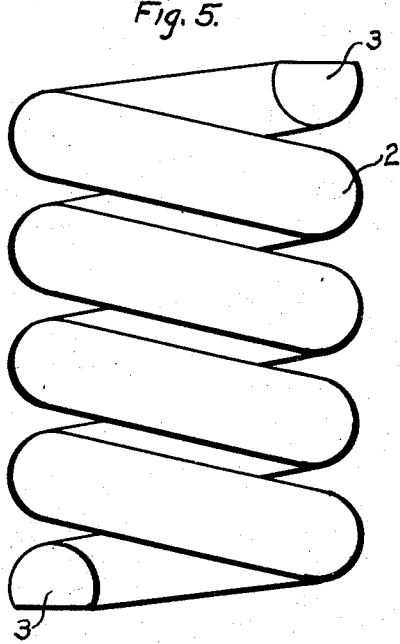
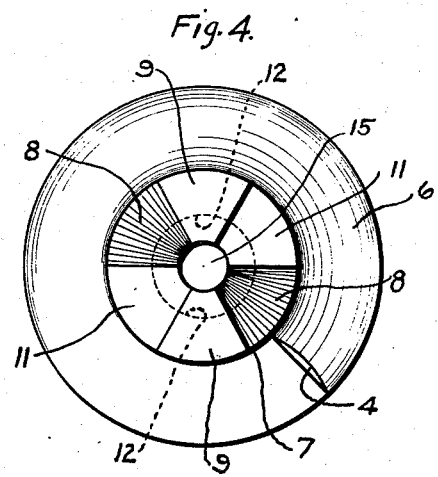
INVENTOR.
BY Harley E. Anderson.
ATTORNEYS.

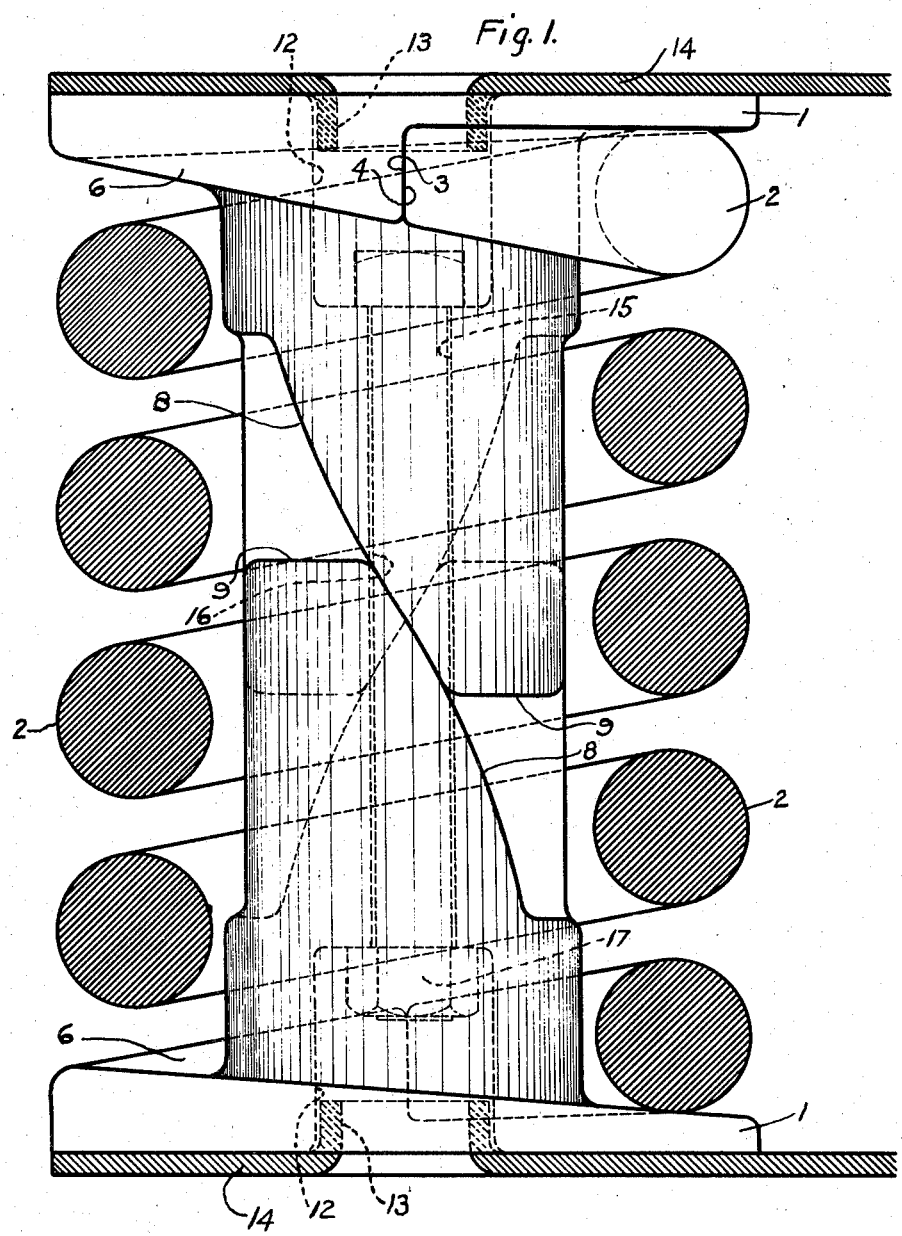

Patented June 13, 1939

2,162,342

UNITED STATES PATENT OFFICE 2,162,342

BOLSTER SPRING

Harley E. Anderson, Chicago, Ill., assignor of one-half to W. F. White, Fort Worth, Tex.

Application November 4, 1938, Serial No. 238,743

7 Claims. (Cl. 267—9)

The invention relates generally to bolsters and more particularly to bolster springs for the reduction of excessive recoil of the spring nest. Various devices have been constructed in the past which are substituted for one of the springs in the spring nest, these devices usually providing a form of friction wedge in conjunction with a spring somewhat smaller than the original spring in the nest and of square or triangular cross section. Likewise, these devices employ numerous parts which, due to the limitation in size, must be constructed relatively small.

The present invention has as one of its most important objects the production of a bolster spring in which three forces are utilized; namely, spring compression, friction, and the torque of the spring itself, thereby providing a spring, the capacity of which increases with the load thereon.

Another important object of the invention is the construction of such a device which, after the compression force is removed, will be positively released, the spring in no way prevented from returning to its normal position, thus providing a construction in which the expansion of the spring is independent of the load thereon as well as from any force that would restrict the return thereof in contrast to other devices in which the tendency to stick increases greatly with an increase in load.

Another object of the invention is the construction of such a device wherein the spring used is the usual round spring and of substantially the same effective length as that ordinarily used in the spring nest, the present device occupying substantially the same amount of space as a regular spring.

Another object of the invention is the production of such a device comprising relatively few parts which, as a result thereof, may be constructed much stronger than those of previous devices, thereby greatly increasing the life of the device.

Another object of the invention is the production of such a bolster spring which may be used with the usual spring caps and which may be inserted with either end up, the two parts of the device other than the spring being interchangeable with one another.

Many other objects and advantages of the construction herein shown and described will be obvious to those skilled in the art from the disclosure herein given.

To this end my invention consists in the novel construction, arrangement and combination of parts herein shown and described and more particularly pointed out in the claims.

In the drawings wherein like reference characters indicate like or corresponding parts:

Fig. 1 is an elevational view of the device with approximately half of the spring cut away to reveal the inner members;

Fig. 2 is a perspective view of the friction blocks or members in free height position with the spring removed;

Fig. 3 is a perspective view similar to Fig. 2, showing the blocks in solid height position;

Fig. 4 is a plan view of one of the blocks looking toward the face thereof; and

Fig. 5 is an elevational view of the spring used in conjunction with the blocks.

The device is adapted to be substituted for one or more of the usual springs in the spring nest, four of the devices being generally used on the ordinary car. When the device is so used, the total spring nest capacity is very much increased under full load and the recoil of the springs in the nest is reduced just enough to insure smooth riding, thereby reducing damage to lading caused by the vertical motion of the car, were live coil springs used. Likewise, because excessive recoil of the spring nest is reduced, higher speeds of freight cars may be permitted with safety, thus decreasing derailments and reducing wear on bolsters and side frames because vertical movement of the bolster is controlled from unnecessary movements. As illustrated in the drawings, the device comprises three essential parts, two friction blocks 1, each of the same size and shape, and a spring 2, the latter being round in cross section and similar to the standard truck springs. The ends of the spring are cut at right angles to the center line of the wire as shown at 3, and the blocks 1 are each provided with a shoulder 4 which is of the same shape as the ends of the spring, the latter butting against the same, said shoulder being formed adjacent the base 5 of the respective blocks and, as shown at 6, forming the equivalent of what would be the extreme end of the ordinary bolster spring. Extending from each block is a cylindrically shaped column 7 and formed in said column are two inclined frictional surfaces 8, the latter being positioned at 180 degrees from one another with the top faces 9 adjacent the respective surfaces 8, of substantially the same size and shape as the portion 11 at the bottom of the inclined surfaces so that when two blocks are taken and placed together in opposed relation, as shown in Figs. 1, 2, and 3, the two blocks will nest as shown in Fig. 3 with the inclined surfaces 8 of the two blocks adjacent one another. Thus, it will be seen that the blocks, when moved from the position shown in Fig. 2 to that shown in Fig. 3 must of necessity rotate relative each other. Each block is provided with a bore 12 adjacent the base of a size to receive the flange 13 formed on an ordinary spring cap 14, and extending through the column 7 is a smaller bore 15 of a size to receive a bolt 16, the latter being threaded at the end thereof to receive a nut 17. It might be mentioned that the bolt 16 and nut 17 are not essential to the operation of the device, being employed principally to maintain the parts in assembled relation during shipping and the like, and may be omitted when the device is placed in the spring nest. The device is assembled as shown in Fig. 1, one block being inserted in each end of the spring with the inclined surfaces 8 of the respective blocks adjacent one another, after which the unit is inserted in the usual spring nest between the usual spring caps 14, the flange portion 13 thereof extending into the bore 12, thereby preventing the device from becoming disengaged therewith. The spring 2 is of a length to position the end thereof adjacent the shoulders 4 of the respective blocks when the latter are in the position shown in Figs. 1 and 2, the shoulders 4 being substantially 180° apart.

The operation of the device is as follows:

When pressure is exerted on the spring caps, the two blocks will be urged toward one another, thereby compressing the spring 2. However, to accomplish this, the blocks must rotate relative one another, creating a frictional resistance between the two adjacent surfaces 8 of the respective blocks. This rotation amounts approximately to $\frac{7}{16}$" on each block or, assuming one block remains stationary and the other block rotates relative thereto, the total revolution between the two blocks would be about $\frac{7}{8}$". This rotation of the blocks is resisted by two forces; first, the torque of the spring 2 as the rotation tends to unwind the spring, and second, as the bases 1 of the respective blocks seat upon the spring caps 14, the frictional contact between the plates and the face of the bases 1 opposes the rotation of said bases relative to the spring caps. It will be seen, therefore, that when the two spring caps 14 are placed under load, three distinct actions take place, first, the cam effect between the two adjacent inclined surfaces 8 of the respective blocks, tending to rotate the blocks in opposite directions relative to each other, also providing frictional resistance between the inclined surfaces 8; second, the rotation of the blocks tends to unwind the spring 2; and third, the frictional resistance created between the blocks and their respective spring caps. Thus, it will be seen that in addition to the compressing of the spring, the torque thereof is utilized as well as frictional means. Likewise, when the load on the spring caps is diminished, the spring is entirely free to expand and when the friction between the device and the spring cap has been reduced sufficiently, the spring torque will rotate the blocks back to their normal position. As there is nothing preventing the spring from returning when the load is diminished, the device cannot stick in any manner, but must positively release, and it has been determined by tests that the present device not only cannot stick, but also will release much faster than the ordinary type of friction bolster spring, the latter requiring a much greater diminishing of the load before the same will release.

Another distinct advantage of this construction is that the capacity of the spring increases with the load. This is due to the fact that as the load increases, the friction between the spring cap and the adjacent member or block increases which makes it that much more difficult to rotate the block. Naturally, as the block must turn before compression can take place, the heavier the load the greater the force necessary to compress the spring, and resulting in increased capacity thereof. However, it will be seen that even though the load be increased, the spring will always be free to expand, the increase creating no possibility of the device sticking.

It will be noted from the above description that I have provided a bolster spring of the type described which utilizes not only compression of the spring and friction between the members thereof, but also the torque of the spring and frictional engagement between the device and the spring cap.

Also, I have provided a device which is universal, having relatively few parts and which may be used to replace the ordinary springs without any mechanical changes of the spring nest.

Having thus described my invention, it is obvious that various immaterial modifications may be made in the same without departing from the spirit of my invention; hence, I do not wish to be understood as limiting myself to the exact form, construction, arrangement and combination of parts herein shown and described or uses mentioned.

What I claim as new and desire to secure by Letters Patent is:

1. In a bolster support, a helical spring and a pair of members, each adjacent one end of the spring, and rotatable relative to one another about the axis of said spring, the latter seating on each member, a shoulder on each member in opposed relation to the respective end of said spring, and engageable therewith, a pair of open faced inclined surfaces on each member, said surfaces being 180° apart relative to said axis, the surfaces on one member being engageable with those on the other to rotate the members when they are moved towards each other as the spring is placed under compression.

2. In a bolster support, a pair of similarly shaped members and a helical spring positioned between and engageable with the members, said members being so formed and arranged as to be rotated one relative to the other when the spring is placed under compression and to move the spring in an unwinding direction on said rotative movement of the members.

3. In a bolster support, a pair of similarly shaped members and a helical spring positioned between and seated on said members with the ends of said spring in abutting engagement with portions thereof, said members being formed with cooperating contacting face portions to cause rotation of one member relative to the other when the spring is placed under compression and the ends of the spring being moved in an unwinding direction on said rotative movement of the members.

4. In a bolster support, a pair of similarly shaped members and a helical spring positioned between said members, each of said members being formed with a shoulder to be engaged by an end of the spring and having cooperating contacting face portions to cause rotation of one member relative to the other only when the spring is placed under compression, the engagement of the shoulders with the ends of the springs moving the latter in a direction to unwind the spring.

5. In a bolster support, a pair of similarly shaped members assembled with overlapping portions and a spring positioned between and normally holding the members in expanded position, said overlapped portions of the members being so formed as to provide contacting face portions adapted to cause rotation of one member relative to the other on compression of the spring but to separate axially in non-rotative relation as the spring returns to expanded position.

6. In a bolster support, a pair of members and a spring positioned between and engageable therewith, said members being so formed and arranged as to be rotated one relative to the other as the spring is compressed by increase of load from normal and to move the ends of the spring to increase the torque thereof, said members separating by an axial non-rotative movement as the load on the spring is decreased and on return of the load to substantially normal the spring will act to rotate the members one relative to the other to their normal positions.

7. In a bolster support, a pair of members, a spring positioned between and engageable therewith, and a cap in frictional engagement with an end portion of each member, said members being so formed and arranged as to be rotated one relative to the other as the spring is compressed by increase of load from normal, said rotative movement of the members moving the ends of the spring to increase the torque thereof and to overcome the frictional engagement of the members with their respective caps, said members separating by an axial non-rotative movement as the load on the spring is decreased and on return of the load to substantially normal said spring will act to rotate the members one relative to the other overcoming the frictional engagement between the members and their respective caps so as to return said members to their normal positions.

HARLEY E. ANDERSON.